(12) United States Patent
Thomas et al.

(10) Patent No.: US 10,890,085 B2
(45) Date of Patent: Jan. 12, 2021

(54) ANTI-ROTATION FEATURE

(71) Applicant: Rolls-Royce Corporation, Indianapolis, IN (US)

(72) Inventors: David J. Thomas, Brownsburg, IN (US); Jeffrey A. Walston, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 142 days.

(21) Appl. No.: 16/133,175

(22) Filed: Sep. 17, 2018

(65) Prior Publication Data
US 2020/0088065 A1    Mar. 19, 2020

(51) Int. Cl.
 *F01D 25/24*  (2006.01)
 *F01D 11/08*  (2006.01)

(52) U.S. Cl.
 CPC ............ *F01D 25/246* (2013.01); *F01D 11/08* (2013.01); *F05D 2230/80* (2013.01); *F05D 2240/14* (2013.01); *F05D 2240/40* (2013.01); *F05D 2240/91* (2013.01)

(58) Field of Classification Search
 CPC ........ F01D 11/08; F01D 11/12; F01D 11/122; F01D 11/125; F01D 11/127; F01D 25/24; F01D 25/243; F01D 25/246; F01D 25/28; F05D 2260/30; F05D 2300/6033; F05D 2240/14; F05D 2240/91; F05D 2230/60; F05D 2230/80
 See application file for complete search history.

(56) References Cited

U.S. PATENT DOCUMENTS

| | | | | |
|---|---|---|---|---|
| 3,067,983 | A | * 12/1962 | Koziura | F01D 9/042 415/209.2 |
| 3,644,057 | A | * 2/1972 | Steinbarger | F01D 25/246 415/209.1 |
| 5,462,403 | A | * 10/1995 | Pannone | F01D 9/042 415/173.1 |
| 7,287,955 | B2 | 10/2007 | Amiot et al. | |
| 8,092,157 | B2 | 1/2012 | McCaffrey | |
| 8,585,357 | B2 | 11/2013 | DiPaola et al. | |
| 8,596,969 | B2 | 12/2013 | Chuong et al. | |
| 8,864,450 | B2 | 10/2014 | Gasmen et al. | |
| 9,133,732 | B2 | 9/2015 | Afanasiev | |
| 2003/0202876 | A1 | * 10/2003 | Jasklowski | F01D 11/025 415/135 |
| 2007/0025837 | A1 | * 2/2007 | Pezzetti, Jr. | F01D 11/005 415/115 |

\* cited by examiner

*Primary Examiner* — Christopher Verdier
*Assistant Examiner* — Elton K Wong
(74) *Attorney, Agent, or Firm* — Barnes & Thornburg LLP

(57) ABSTRACT

A blade track assembly and methods thereof includes an anti-rotation device having an arcuate body and tabs extending for engagement within an anti-rotation slot of the blade track. The anti-rotation device may be formed to include an annular shape connected at a flange of the casing to reduce spatial requirements while blocking against rotation of the blade track.

17 Claims, 3 Drawing Sheets

ANTI-ROTATION FEATURE

BACKGROUND

The present disclosure relates generally to component for turbomachinery, and more specifically to components for turbomachinery such as gas turbine engines.

Gas turbine engines are used to power aircraft, watercraft, electric generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines, can be advantageously endured by use of ceramic materials. However, supporting ceramic materials can create challenges including those challenges related to thermal growth rates.

SUMMARY

The present disclosure may comprise one or more of the following features and combinations thereof.

According to one aspect of the present disclosure, a blade track assembly of a gas turbine engine may include a blade track for guiding flow of high pressure exhaust flow including a ceramic seal plate that defines a radial flow boundary for the high pressure exhaust flow, a carrier connected with the ceramic track plate and including a number of hangers supporting the ceramic track plate in position to define the radial flow boundary, a support casing for supporting the high pressure seal in position to guide the high pressure exhaust flow, the support casing including an annular body having a forward flange for connection with upstream casing, the annular body engaged with the number hangers to provide support to the blade track, and an anti-rotation device for providing circumferential support to the blade track to block against rotation. The anti-rotation device may include an arcuate body secured with the support casing and at least one engagement tab extending radially inward from the body to engage the blade track.

In some embodiments, the anti-rotation device may include an annular section formed of a sheet. The anti-rotation device may be secured with the forward flange of the support casing. The anti-rotation device may be formed to receive an aft casing flange secured therewith opposite the forward flange of the support casing.

In some embodiments, the blade track may include an anti-rotation slot formed complimentary to the at least one engagement tab. The anti-rotation slot may be open facing radially outward to receive the at least one engagement tab therein with the annular body disposed radially outward of the anti-rotation slot. The anti-rotation slot may be open facing forward to permit entry of the engagement tab into the anti-rotation slot by rearward translation of the anti-rotation ring.

In some embodiments, the anti-rotation slot may be defined by at least one section of a forward arm of the number of hanger arms. The anti-rotation slot may be defined as a gap formed between two adjacent sections of the forward arm of the number of hanger arms. The engagement tab may engage a circumferential end of at least one of the two adjacent sections of the forward arm to block against rotation of the blade track. In some embodiments, the blade track may be a first-stage blade track.

According to another aspect of the present disclosures, a segmented track assembly of a gas turbine engine may include a segmented blade track for guiding flow of high pressure exhaust flow including a ceramic track plate that defines a radial flow boundary for the high pressure exhaust flow, a carrier segment connected with the ceramic track plate and having a number of hangers supporting the ceramic track plate in position to define the radial flow boundary, a support casing for supporting the blade track in position to guide the high pressure exhaust flow, the support casing including an annular body having a forward flange for connection with upstream casing, the annular body engaged with the number hangers to provide support to the blade track, and an anti-rotation ring for providing circumferential support to the blade track to block against rotation. The anti-rotation ring may include an annular body secured with the support casing and at least one engagement tab extending radially inward from the body to engage at least one segment of the blade track.

In some embodiments, the anti-rotation ring may include an annular section formed of a sheet. The anti-rotation ring may be secured with the forward flange of the support casing. The anti-rotation ring may be formed to receive an aft casing flange secured therewith opposite the forward flange of the support casing.

In some embodiments, the segmented blade track may include at least one segment including an anti-rotation slot formed complimentary to the at least one engagement tab. The anti-rotation slot may be open facing radially outward to receive the at least one engagement tab therein with the annular body disposed radially outward of the anti-rotation slot. The anti-rotation slot may be open facing forward to permit entry of the engagement tab into the anti-rotation slot by rearward translation of the anti-rotation ring.

In some embodiments, the anti-rotation slot may be defined by at least one section of a forward arm of the number of hanger arms. The anti-rotation slot may defined as a gap formed between two adjacent sections of the forward arm of the number of hanger arms. The engagement tab may engage a circumferential end of at least one of the two adjacent sections of the forward arm to block against rotation of the blade track.

According to another aspect of the present disclosures, a method of assembly of a track assembly of a gas turbine engine may include coupling a blade track with a support casing of the gas turbine engine, and translating an anti-rotation ring rearward to provide anti-rotation of the blade track. The anti-rotation ring may include an annular body and at least one engagement tab projecting radially inward from the annular body. Translating may include arrangement of the engagement tab within an anti-rotation slot of the blade track.

These and other features of the present disclosure will become more apparent from the following description of the illustrative embodiments.

DETAILED DESCRIPTION OF THE DRAWINGS

Figure 1:
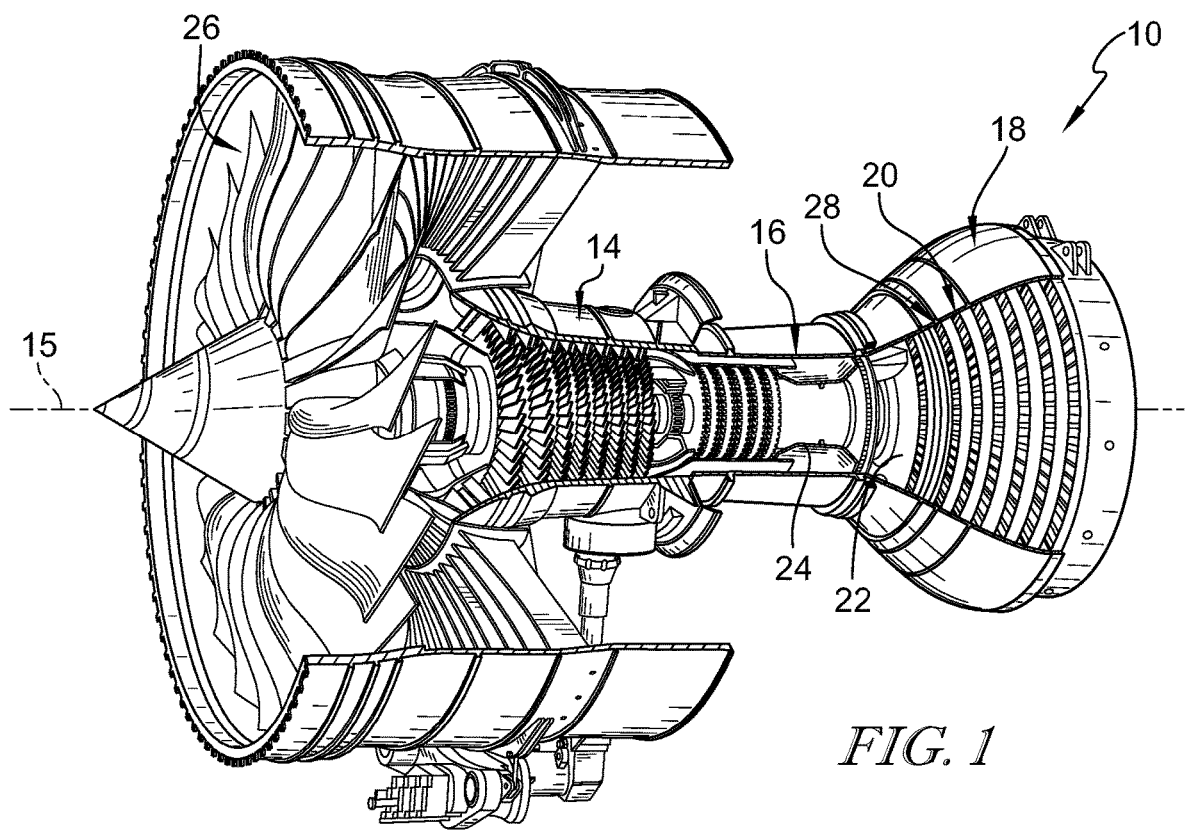
FIG. 1 is a perspective view of a gas turbine engine having a portion cutaway to reveal certain internals including a blade track assembly of the turbine section for guiding hot, high pressure exhaust flow to expand across turbine blades to rotate a rotor.

For the purposes of promoting an understanding of the principles of the disclosure, reference will now be made to a number of illustrative embodiments illustrated in the drawings and specific language will be used to describe the same.

Ceramic materials, including ceramic matrix composites (CMC), can provide advantages to gas turbine engine operation. For example, CMCs can offer excellent performance at high temperatures while maintaining lower weight than many other materials. Yet, supporting CMCs in adapted uses for engagement with high temperature exhaust flow can present challenges. For example, interfacing such CMC materials with supporting structures including metallic materials can be challenging due to differences in thermal growth.

An illustrative gas turbine engine 10 for combusting a mixture of fuel and air to provide mechanical power is shown in FIG. 1 having an outer portion partly removed for descriptive purposes. The gas turbine engine 10 includes a compressor 14 which compresses air for combustion. The compressed air is mixed with fuel and combusted within a combustor 16 to produce high temperature/pressure exhaust flow. The gas turbine engine 10 includes a turbine section 18 arranged to receive and expand the exhaust flow across its blades 20 to drive a rotor 22 and shaft assembly 24 to provide rotational energy to the compressor 14 and optionally an intake fan 26 for rotation about a rotational axis 15. A blade track assembly 28 extends circumferentially about the blades 20 and rotor 22 to guide the exhaust flow to engage and drive the blades 20 to rotate the rotor 22 within the turbine section 18.

Figure 2:
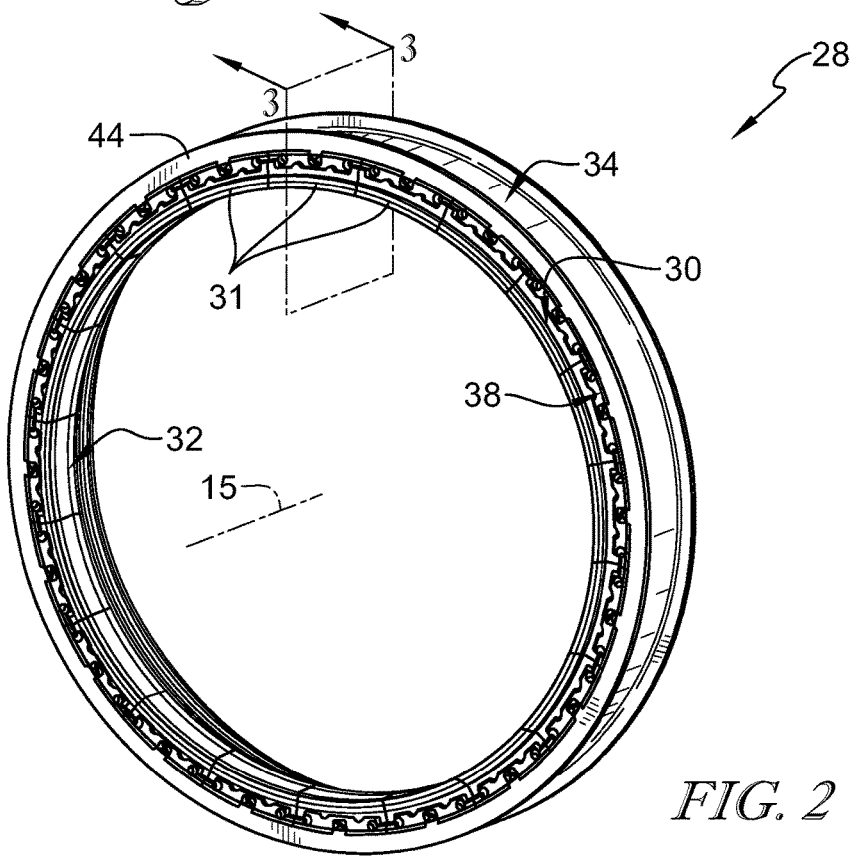
FIG. 2 is a prospective view of the blade track assembly in partial isolation showing that the blade track assembly includes an annular blade track formed of consecutively arranged segments forming a ceramic track seal defining a radial flow boundary for the exhaust flow.

Referring to FIG. 2, the blade track assembly 28 is shown in isolation as an annular track of the turbine section 18. The blade track assembly 28 includes blade track 30 having a ceramic track plate 32 for guiding the exhaust flow to engage the blades 20. The blade track 30 illustratively forms a high pressure seal defined by a number of arcuate segments 31 arranged circumferentially about the rotational axis 15. The ceramic track plate 32 provides a radial boundary to discourage leakage of exhaust flow out from the primary gas flow path, and instead into engagement with the blades 20 of the turbine section 18.

Figure 3:
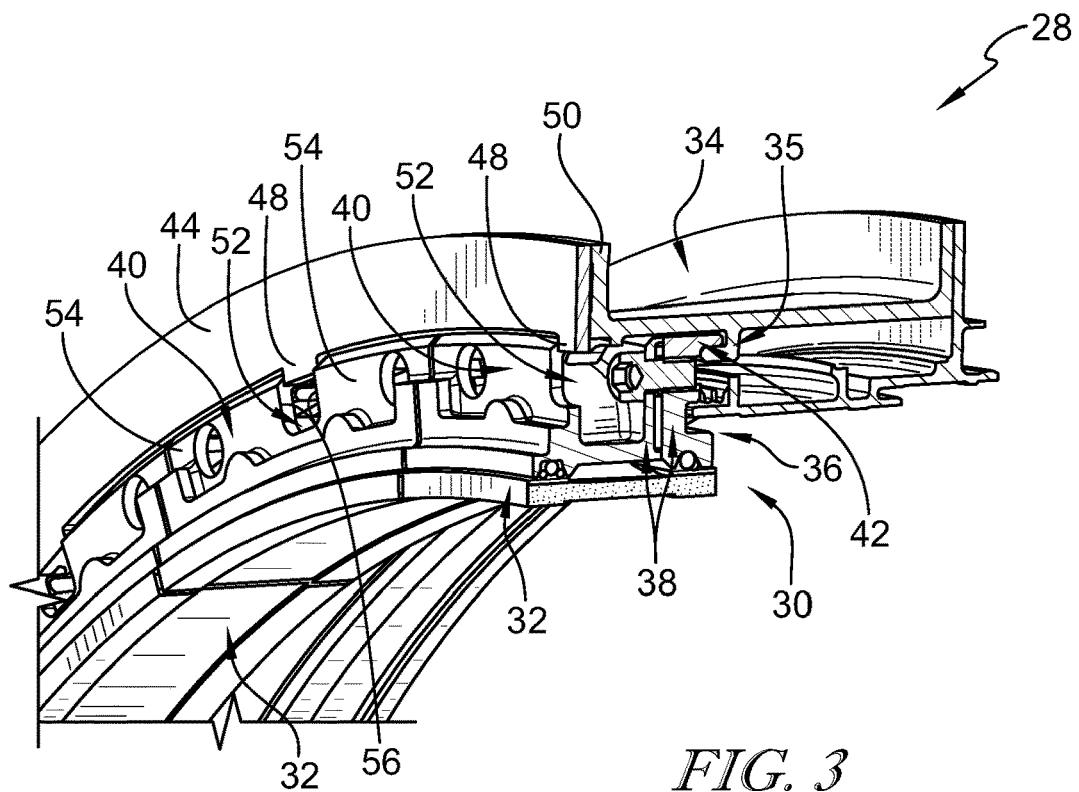
FIG. 3 is a cross-sectional view of the blade track assembly taken along the plane 3-3 of FIG. 2 showing that the blade track assembly includes an anti-rotation ring including an annular body having tabs extending inward for engagement with the blade track to block against rotation.

As shown in FIG. 3, the blade track assembly 28 illustratively includes an outer casing 34 for supporting blade track 30 in position. The casing 34 illustratively includes L-shaped arms 35 extending radially inward to engage the blade track 30. The blade track 30 includes a carrier 36 coupled with the track plate 32 and engaged with the casing 34.

The carrier 36 includes a main section 38 engaged with the track plate 32 and L-shaped hanger arms 40, 42 extending radially outward from the main section 38 for engagement with the arms 35 of the casing 34. The main section 38 is illustratively embodied to include two portions bolted together, but in some embodiments, may be formed of a single integral portion or of any suitable number of portions. An anti-rotation ring 44 is arranged to block against rotation of the blade track 30.

The anti-rotation ring 44 illustratively includes an arcuate body 46 and engagement tabs 48 extending radially inward from the body 46 for engagement with the blade track 30. The body 46 is illustrative secured with the casing 34 at a forward flange 50, for example, by bolting. Each engagement tab 48 extends into an anti-rotation slot 52 of the blade track 30.

Figure 4:
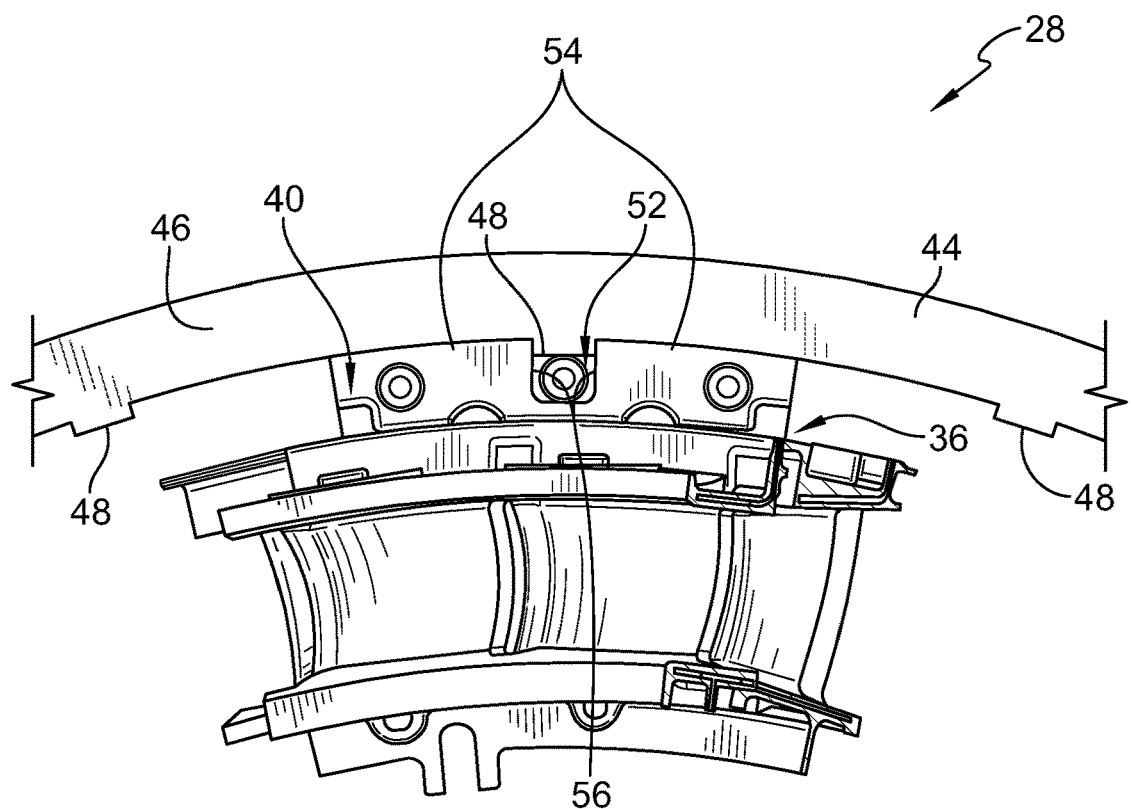
FIG. 4 is an elevation view of a portion of the blade track assembly of FIG. 2 along the axial direction showing that the tabs of the anti-rotation ring extend into anti-rotation slots of the blade trade to block rotation.

As shown in FIG. 4, the anti-rotation slot 52 is illustratively embodied as a gap defined between adjacent sections 54 of the forward hanger arm 40. The anti-rotation slot 52 is formed complimentary to the engagement tab 48 to engage the circumferential ends 56 of the sections 54 to block rotation of the blade track 30. The anti-rotation slot 52 is open facing in the radial direction and the forward direction to receive the engagement tabs 48 into the corresponding slot 52, such that the anti-rotation ring 44 can be installed by translation rearward (i.e., into the page in the orientation in FIG. 4) into position after coupling the blade track 30 with the casing 34.

A number of turbine blades 20 are shown having their radial tips near the track plate 32. As previously mentioned, exhaust flow is guided to engage and drive the blades 20 by the radial boundary provided by track plate 32. The blade track 30 thus forms a high pressure seal encouraging exhaust flow to remain in the primary flow path, and increasing thermal efficiency.

Figure 5:
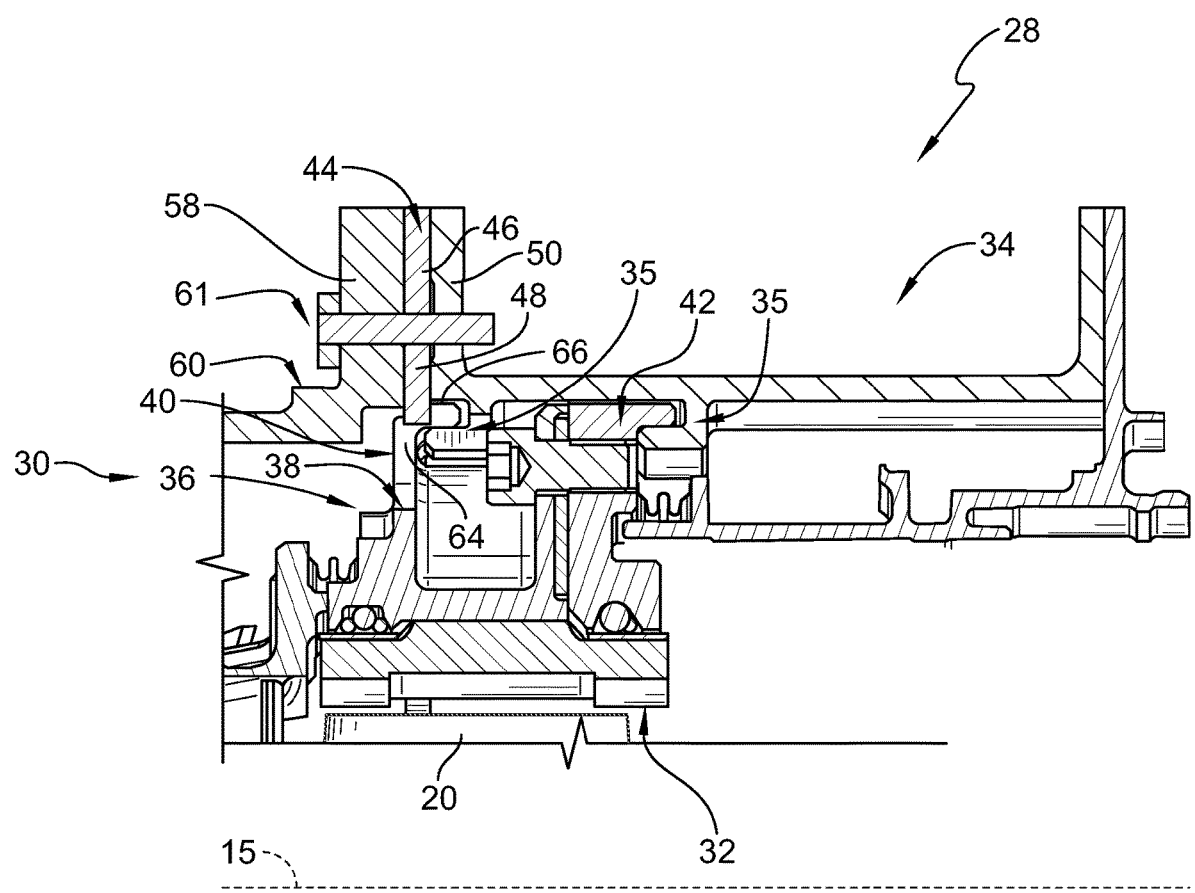
FIG. 5 is a cross-sectional view of the blade track assembly installed as in FIG. 1 taken along the rotational axis and showing that the anti-rotation ring is forms a sheet and showing that the tab extends for engagement with an arm of the blade track.

Referring to FIG. 5, a cross-section shows that the anti-rotation ring 44 is illustratively formed of a sheet stock, having coplanar arrangement of the body 46 and tab 48. However, in some embodiments, any suitable fabrication manner may be applied to produce the coplanar arrangement including forging, casting, and 3D printing. Integral formation of the body 46 and engagement tab 48 can reduce manufacturing complexity, time, and/or cost. In the illustrative embodiment, the track plate 32 is embodied as a first stage track plate 32 arranged near the radial tip of a first stage course of blades 20. The anti-rotation ring 44 is illustratively secured to the casing 34 between an aft flange 58 of a forward portion of casing 60. The aft flange 58 is illustratively secured with both of the anti-rotation ring 44 and the forward flange 50, as a part of a triple flange. As previously mentioned, the triple flange is illustratively bolted together by fastener 61. Accordingly, disclosed arrangements of the anti-rotation ring 44 can reduce spatial requirements which providing anti-rotation control to the blade track 30.

The forward arm 40 illustratively includes a stem 64 extending from the main section 38 and a limb 66 extending from the stem 64. The engagement tab 48 engages the forward arm 40 at an interface between the stem 64 and the limb 66. Accordingly, the engagement tab 48 illustratively engages both the stem 64 and limb 66 to provide anti-rotation to the blade track 30.

As technology surrounding CMC high pressure seal assemblies (e.g., blade track assembly) develops, the space claim associated with such components can be important. Thus, means of arranging a CMC high pressure seal assembly in a turbine section in a compact manner can be valuable. The present disclosure includes means for providing robust anti-rotation capability to high pressure seal assemblies with features that consume a small space claim. Anti-rotation of the high pressure seal assembly enables the assembly to tolerate a rub from the turbine blade while remaining overall stationary in the engine. This can protect against significant damage to the blade and/or surrounding components.

Anti-rotation features can require substantial enough design to withstand the forces encountered during a rub event, yet compact enough to avoid consuming valuable space, for example, space routinely required by CMC high pressure seal assemblies to function. In certain implementations, for example, when considering turbine designs utilizing a CMC high pressure seal assembly over the first turbine stage, a case flange joint may exist in close axial proximity to the high pressure seal assembly. The present disclosure includes locations of anti-rotation features in a pre-existing flange joint. In some implementations, such anti-rotation features and/or devices can be fully annular.

Anti-rotation features within the present disclosure may engage the high pressure seal assembly by placing a radially protruding feature into a space formed in the carrier. Such features could be, but are not limited to, hanger features, existing anti-rotation features for other adjacent turbine components, and/or any other circumferentially non-continuous feature of the carrier assembly. In the exemplary embodiments, the anti-rotation feature may include an anti-rotation ring and the high pressure seal may take advantage of a common requirement for unimpeded airflow from the cavity forward of the high pressure seal assembly to the cavity immediately radially outboard of the high pressure seal assembly. In such embodiments, that requirement may drive a desire for a large orifice area to exist between these two cavities, for design reasons, this area may take the form of a slot in the forward hanger feature that aligns with mechanical fastener features. This may provide a convenient location to engage the anti-rotation ring with the carrier as the forward hanger is generally aligned with the case flange joint.

Advantages of the anti-rotation strategy disclosed herein may include reduced space claim as previously mentioned, but also may include any one or more of the following: If all features can be aligned in a single plane, the anti-rotation ring can be made out of sheet or plate stock of an appropriately capable material, allowing manufacturing to make the ring using a number of cheaper, simpler machining operations. Simplification of adjacent components, which may no longer need to include a circumferentially discontinuous feature. Circumferentially-discontinuous features in what would otherwise be an axisymmetric component drive complexity and often, wasteful machining operations. Elimination of the need for pins dropping in from radially outboard of the casing to engage and anti-rotate the high pressure seal assembly, which may save cost on required machining operations and/or may avoid compromising case strength via stress concentrations at holes and/or welds. And/or, simplification of turbine module assembly procedure by reducing potentially blind assembly features, which can save time and/or cost.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A blade track assembly of a gas turbine engine, the assembly comprising:
    a blade track for guiding flow of high pressure exhaust flow including a ceramic track plate that defines a radial flow boundary for the high pressure exhaust flow, a carrier connected with the ceramic track plate and including a number of hangers supporting the ceramic track plate in position to define the radial flow boundary,
    a support casing for supporting the blade track in position to guide the high pressure exhaust flow, the support casing including an annular body having a forward flange for connection with an upstream casing, the annular body engaged with the number of hangers to provide support to the blade track, and
    an anti-rotation device for providing circumferential support to the blade track to block against rotation, the anti-rotation device including an arcuate body secured with the support casing and at least one engagement tab extending radially inward from the arcuate body to engage the blade track,
    wherein the anti-rotation device is secured to and in contact with the forward flange of the support casing.

2. The blade track assembly of claim 1, wherein the anti-rotation device includes an annular section formed of a sheet.

3. The blade track assembly of claim 1, wherein the anti-rotation device is formed to receive an aft casing flange secured therewith opposite the forward flange of the support casing.

4. The blade track assembly of claim 1, wherein the blade track includes an anti-rotation slot formed complimentary to the at least one engagement tab and open facing radially outward to receive the at least one engagement tab therein with the annular body disposed radially outward of the anti-rotation slot.

5. The blade track assembly of claim 4, wherein the anti-rotation slot is open facing forward to permit entry of the at least one engagement tab into the anti-rotation slot by rearward translation of the anti-rotation device.

6. The blade track assembly of claim 4, wherein the anti-rotation slot is defined by at least one section of a forward arm of the number of hangers.

7. The blade track assembly of claim 6, wherein the anti-rotation slot is defined as a gap formed between two adjacent sections of the forward arm of the number of hangers.

8. The blade track assembly of claim 7, wherein the at least one engagement tab engages a circumferential end of at least one of the two adjacent sections of the forward arm to block against rotation of the blade track.

9. The blade track assembly of claim 1, wherein the blade track is a first-stage blade track.

10. A segmented track assembly of a gas turbine engine, the assembly comprising:
    a segmented blade track for guiding flow of high pressure exhaust flow including a ceramic track plate that defines a radial flow boundary for the high pressure exhaust flow, a carrier segment connected with the ceramic track plate and having a number of hangers supporting the ceramic track plate in position to define the radial flow boundary, a support casing for supporting the blade track in position to guide the high pressure exhaust flow, the support casing including an annular body having a forward flange for connection with an upstream casing, the annular body engaged with the number of hangers to provide support to the blade track, and an anti-rotation ring for providing circumferential support to the blade track to block against rotation, the anti-rotation ring including an arcuate body secured with the support casing and at least one engagement tab extending radially inward from the arcuate body to engage at least one segment of the blade track, wherein the segmented blade track includes at least one segment including an anti-rotation slot formed complimentary to the at least one engagement tab, the anti-rotation slot being open facing radially outward to receive the at least one engagement tab therein with the annular body disposed radially outward of the anti-rotation slot, and wherein the anti-rotation slot is defined by at least one section of a forward arm of the number of hangers.

11. The segmented track assembly of claim 10, wherein the anti-rotation ring includes an annular section formed of a sheet.

12. The segmented track assembly of claim 10, wherein the anti-rotation ring is secured with the forward flange of the support casing.

13. The segmented track assembly of claim 12, wherein the anti-rotation ring is formed to receive an aft casing flange secured therewith opposite the forward flange of the support casing.

14. The segmented track assembly of claim 10, wherein the anti-rotation slot is open facing forward to permit entry of the at least one engagement tab into the anti-rotation slot by rearward translation of the anti-rotation ring.

15. The segmented track assembly of claim 10, wherein the anti-rotation slot is defined as a gap formed between two adjacent sections of the forward arm of the number of hangers.

16. The segmented track assembly of claim 15, wherein the at least one engagement tab engages a circumferential end of at least one of the two adjacent sections of the forward arm to block against rotation of the blade track.

17. A method of assembly of a track assembly of a gas turbine engine, the method comprising:

coupling a blade track with a support casing of the gas turbine engine, the support casing including an annular body, and translating an anti-rotation ring rearward of the gas turbine engine to provide anti-rotation of the blade track, the anti-rotation ring including an arcuate body and at least one engagement tab projecting radially inward from the arcuate body, wherein translating includes arrangement of the at least one engagement tab within an anti-rotation slot of the blade track, wherein the track assembly includes a carrier connected with the blade track and including a number of hangers, wherein the blade track includes at least one segment including the anti-rotation slot formed complimentary to the at least one engagement tab, the anti-rotation slot being open facing radially outward to receive the at least one engagement tab therein with the annular body disposed radially outward of the anti-rotation slot, and wherein the anti-rotation slot is defined by at least one section of a forward arm of the number of hanger arms.

* * * * *